(12) United States Patent
Lee et al.

(10) Patent No.: US 11,515,569 B2
(45) Date of Patent: Nov. 29, 2022

(54) METHOD FOR MANUFACTURING FLEXIBLE BATTERY, AND FLEXIBLE BATTERY MANUFACTURED THEREBY

(71) Applicant: LG Chem, Ltd., Seoul (KR)

(72) Inventors: Jung-Pil Lee, Daejeon (KR); In-Sung Uhm, Daejeon (KR)

(73) Assignee: LG Energy Solution, Ltd.

( * ) Notice: Subject to any disclaimer, the term of this patent is extended or adjusted under 35 U.S.C. 154(b) by 257 days.

(21) Appl. No.: 16/630,302

(22) PCT Filed: Sep. 4, 2018

(86) PCT No.: PCT/KR2018/010320
§ 371 (c)(1),
(2) Date: Jan. 10, 2020

(87) PCT Pub. No.: WO2019/045552
PCT Pub. Date: Mar. 7, 2019

(65) Prior Publication Data
US 2020/0212495 A1 Jul. 2, 2020

(30) Foreign Application Priority Data
Sep. 4, 2017 (KR) .................. 10-2017-0112720

(51) Int. Cl.
*H01M 10/0585* (2010.01)
*H01M 4/04* (2006.01)
(Continued)

(52) U.S. Cl.
CPC ..... *H01M 10/0585* (2013.01); *H01M 4/0411* (2013.01); *H01M 4/74* (2013.01);
(Continued)

(58) Field of Classification Search
CPC .. H01M 10/0585; H01M 4/0411; H01M 4/74; H01M 10/052; H01M 50/531;
(Continued)

(56) References Cited

U.S. PATENT DOCUMENTS 9,537,129 B2    1/2017  Rhodes et al.
2010/0075023 A1*  3/2010  Emoto ............... H01M 4/0409
                                                          427/58
(Continued)

FOREIGN PATENT DOCUMENTS

CN    104466093 A    3/2015
CN    104466229 A    3/2015
(Continued)

OTHER PUBLICATIONS

Machine translation of JP 2017054706A, Hayamizu et al., 2017 (Year: 2017).*

(Continued)

*Primary Examiner* — Kwang Han
(74) *Attorney, Agent, or Firm* — Lerner, David, Littenberg, Krumholz & Mentlik, LLP

(57) ABSTRACT

A method for manufacturing a flexible battery includes the steps of: preparing an electrode current collector having a current collecting portion provided with at least one through-hole; carrying out electrospinning of electrode slurry including an electrode active material, a binder, a conductive material and a solvent on at least one surface of an edge of the current collecting portion and over the through-hole to form an electrode active material layer on at least one surface of the electrode current collector; and forming a battery provided with the electrode current collector having the electrode active material layer formed thereon as an electrode. A flexible battery obtained from the method is also provided.

9 Claims, 10 Drawing Sheets

(51) Int. Cl.
  *H01M 4/74* (2006.01)
  *H01M 50/136* (2021.01)
  *H01M 10/052* (2010.01)
  *H01M 50/531* (2021.01)
(52) U.S. Cl.
  CPC ....... *H01M 10/052* (2013.01); *H01M 50/531* (2021.01); *H01M 50/136* (2021.01)
(58) Field of Classification Search
  CPC ............. H01M 50/136; H01M 4/0404; H01M 4/0438; H01M 50/178; H01M 50/105; H01M 4/72; H01M 10/0436; H01M 4/66; H01M 4/742; Y02E 60/10; Y02P 70/50
  See application file for complete search history.

(56) References Cited

U.S. PATENT DOCUMENTS

| | | | |
|---|---|---|---|
| 2014/0011071 A1* | 1/2014 | Suzuki | H01M 50/116 429/153 |
| 2014/0370347 A1 | 12/2014 | Jung et al. | |
| 2014/0370351 A1 | 12/2014 | Kwon et al. | |
| 2014/0377617 A1 | 12/2014 | Kwon et al. | |
| 2015/0162584 A1* | 6/2015 | Uematsu | H01M 50/46 429/211 |
| 2016/0006070 A1 | 1/2016 | Sohn et al. | |
| 2016/0308241 A1* | 10/2016 | Kim | H01M 50/124 |
| 2017/0077480 A1 | 3/2017 | Hwang et al. | |
| 2017/0077546 A1 | 3/2017 | Zhamu et al. | |

FOREIGN PATENT DOCUMENTS

| | | | | |
|---|---|---|---|---|
| EP | 0881699 | * | 12/1998 | ............. H01M 4/80 |
| JP | 2008016446 A | | 1/2008 | |
| JP | 2012129114 A | | 7/2012 | |
| JP | 2014167938 A | | 9/2014 | |
| JP | 2015002173 A | | 1/2015 | |
| JP | 2017504933 A | | 2/2017 | |
| JP | 2017054706 A | * | 3/2017 | ............. H01M 4/13 |
| JP | 2017054706 A | | 3/2017 | |
| KR | 100776766 B1 | | 11/2007 | |
| KR | 20120024856 A | | 3/2012 | |
| KR | 20130089373 A | | 8/2013 | |
| KR | 20150092980 A | | 8/2015 | |
| KR | 20150140619 A | | 12/2015 | |
| KR | 20160004094 A | | 1/2016 | |
| KR | 101628901 B1 | | 6/2016 | |
| KR | 101653164 B1 | | 9/2016 | |
| KR | 20170032031 A | | 3/2017 | |
| KR | 20170084798 A | | 7/2017 | |
| WO | 2009111744 A2 | | 9/2009 | |
| WO | 2010138619 A2 | | 12/2010 | |
| WO | 2017123544 A1 | | 7/2017 | |

OTHER PUBLICATIONS

Extended European Search Report including Written Opinion for Application No. EP18849893 dated Jun. 18, 2020, 6 pgs.
Kumar et al., "Free-standing electrospun carbon nanofibres—a high performance anode material for lithium-ion batteries", Journal of Physics D: Applied Physics, vol. 45, Received in final form May 13, 2012, 5 pgs.
International Search Report for Application No. PCT/KR2018/010320, dated Dec. 20, 2018, pp. 1-3.
Written Opinion for Application No. PCT/KR2018/010320, dated Dec. 20, 2018, pp. 1-5.
Search Report dated May 18, 2022 from Office Action for Chinese Application No. 201880040305.1 dated May 24, 2022. 3 pgs.

* cited by examiner

METHOD FOR MANUFACTURING FLEXIBLE BATTERY, AND FLEXIBLE BATTERY MANUFACTURED THEREBY

CROSS-REFERENCE TO RELATED APPLICATIONS

The present application is a national phase entry under 35 U.S.C. § 371 of International Application No. PCT/KR2018/010320, filed Sep. 4, 2018, which claims priority to Korean Patent Application No. 10-2017-0112720, filed Sep. 4, 2017 in the Republic of Korea, the disclosures of which are incorporated herein by reference.

TECHNICAL FIELD

The present disclosure relates to a method for manufacturing a flexible battery, particularly a method for manufacturing a flexible battery which allows easy design of tabs, and a flexible battery obtained therefrom.

BACKGROUND ART

As technological development and a need for mobile instruments have increased, rechargeable secondary batteries which can be downsized and provided with high capacity have been increasingly in demand. In addition, among such secondary batteries, lithium secondary batteries having high energy density and voltage have been commercialized and used widely.

In general, a lithium secondary battery is provided with an electrode assembly including a positive electrode and a negative electrode formed by applying an active material to the surface of a current collector and interposing a separator between the positive electrode and the negative electrode. Such an electrode assembly is generally received in a cylindrical or prismatic metallic can or a pouch-type casing including an aluminum laminate sheet together with a liquid electrolyte or solid electrolyte. The electrode assembly may have a stacked structure or stacked/folded structure in which a positive electrode, a separator and a negative electrode are stacked successively. In addition, an electrode tab is connected to the current collector of each electrode through welding and an electrode lead is further connected to the electrode tab.

Meanwhile, a foil-type current collector made of a metallic material has been used generally as the current collector. However, in the case of such a foil-type current collector, it is difficult to form an electrode active material to a large thickness, since the binding force between the electrode active material and the current collector is weak, and the active material may be separated with ease upon bending.

Particularly, more recently, flexibility of a current collector is regarded as an important factor, as the flexible batteries have been developed actively. In this context, there have been some attempts to apply a three-dimensional current collector preferred in terms of flexibility and durability.

When a battery is manufactured by using a three-dimensional current collector, it is possible to ensure flexibility but the binding between the three-dimensional current collector and the electrode tab may be broken with ease while bending is maintained continuously. This may result in degradation of the battery performance. In addition, when connecting a tab after forming the electrode assembly, resistance is generated easily at the connection.

Therefore, there is a need for developing a flexible battery which allows easy design of tabs and can retain the binding between a current collector and an electrode tab.

DISCLOSURE

Technical Problem

The present disclosure is designed to solve the problems of the related art, and therefore the present disclosure is directed to providing a flexible battery which allows easy design of tabs.

The present disclosure is also directed to providing a flexible battery obtained from the method.

Technical Solution

In one aspect of the present disclosure, there is provided a method for manufacturing a flexible battery, including the steps of:

preparing an electrode current collector having a current collecting portion provided with at least one through-hole;

carrying out electrospinning of electrode slurry including an electrode active material, a binder, a conductive material and a solvent on at least one surface of an edge of the current collecting portion and over the through-hole to form an electrode active material layer on at least one surface of the electrode current collector; and forming a battery provided with the electrode current collector having the electrode active material layer formed thereon as an electrode.

The current collecting portion except the through-hole may have an area of 4-85% of the total area of the current collecting portion.

The current collecting portion may have a ring-like, mesh-like or grid-like shape.

The electrode current collector may be made of any one material selected from stainless steel, aluminum, nickel, titanium, baked carbon, copper; stainless steel surface-treated with carbon, nickel, titanium, silver, gold or platinum; aluminum-cadmium alloys; non-conductive polymers surface-treated with a conductive material; non-conductive polymers surface-treated with a metal; and conductive polymers.

The step of forming an electrode active material layer may include carrying out masking at a tab connecting portion of the electrode current collector by using a mask, before the electrospinning step, forming an electrode active material layer through electrospinning, and then removing the mask from the tab connecting portion of the electrode current collector.

The electrode may be at least one of a positive electrode and a negative electrode.

The step of forming a battery may include forming an electrode assembly including the electrode and a separator, and introducing the electrode assembly into a battery casing.

In another aspect of the present disclosure, there is provided a flexible battery which includes an electrode assembly having a positive electrode, a negative electrode and a separator interposed therebetween, and an electrolyte, wherein at least one of the positive electrode and the negative electrode includes: a current collector having a current collecting portion provided with at least one through-hole; and an electrode active material layer formed on at least one surface of an edge of the current collector and over the through-hole.

The current collecting portion except the through-hole may have an area of 4-85% of the total area of the current collecting portion.

In addition, a tab connecting portion extended from the edge of the current collecting portion and an electrode tab connected to the tab connecting portion may have a binding strength of 0.5-1 kgf/6 mm.

A tab connecting portion extended from the edge of the current collecting portion and connected to a tab may be provided with one or more through-holes.

Advantageous Effects

According to the present disclosure, during the manufacture of a flexible battery, an electrode active material layer is formed through electrospinning on an electrode current collector having a current collecting portion provided with at least one through-hole. Thus, it is possible to form a tab with ease, and to prevent the problems occurring in the conventional electrode using a three-dimensional current collector, i.e., generation of resistance at the tab connecting site and separation of a tab from an electrode current collector under continuous bending. In addition, the electrode active material layer is formed through electrospinning after masking a tab connecting portion, and then an electrode tab and an electrode lead are connected to the tab connecting portion. In this manner, it is possible to reduce electric resistance generated upon the connection of an electrode tab and to improve the binding strength between the electrode current collector and the electrode tab. As a result, it is possible to increase the capacity retention of a finished flexible battery after repeating cycles.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect, there is provided a method for manufacturing a flexible battery. Hereinafter, the method for manufacturing a flexible battery according to the present disclosure will be explained in detail with reference to the accompanying drawings.

Figure 2A:
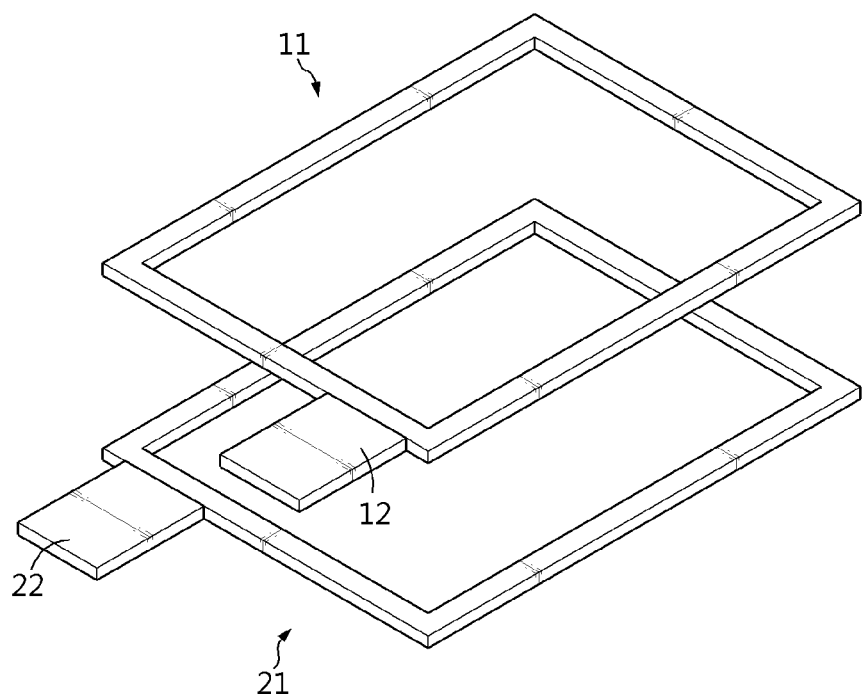
FIG. 2a to FIG. 2e illustrate a series of steps for manufacturing a flexible battery according to an embodiment of the present disclosure.

First, as shown in FIG. 2a, prepared are a positive electrode current collector and a negative electrode current collector each having a current collecting portion 11, 21 provided with at least one through-hole, and a tab connecting portion 12, 22 extended from an edge of the current collecting portion (S1).

Since the electrode current collector is provided with a tab connecting portion, it is easy to connect a tab thereto through welding. In addition, it is possible to provide excellent binding strength between the electrode current collector and the tab when the tab is connected. Further, it is possible to ensure flexibility by virtue of at least one through-hole provided in the current collecting portion.

The electrode current collector ensures higher flexibility as compared to a foil-type current collector made of a metallic material. Thus, even when a current collector having a thick electrode active material layer formed thereon is bent, no separation of the active material occurs, which is useful for the manufacture of a flexible battery. In addition, in the case of a three-dimensional current collector used for the conventional flexible batteries, there is a problem in that resistance is generated at the tab connecting site and the tab may be detached easily from the current collector when bending is continued. It is possible to overcome the problem according to the present disclosure.

In the current collector, the area of the current collecting portion except the through-hole may be 4-85%, 20-85%, or 4-20% based on the total area of the current collecting portion. When the area of the current collecting portion except the through-hole satisfies the above-defined range, it is possible to reduce resistance and to improve flexibility. For example, when the area of the current collecting portion except the through-hole is less than 4%, resistance of the current collector and electrode active material is increased. When the area of the current collecting portion except the through-hole is larger than 85%, the active material may be separated due to low flexibility, when the battery is bent.

Figure 1A:
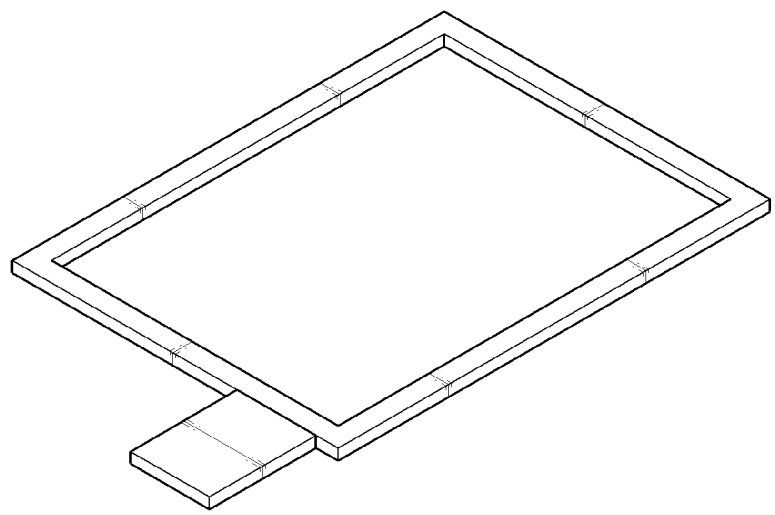
FIG. 1a to FIG. 1f illustrate various embodiments of current collectors applicable to the present disclosure.
Figure 1B:
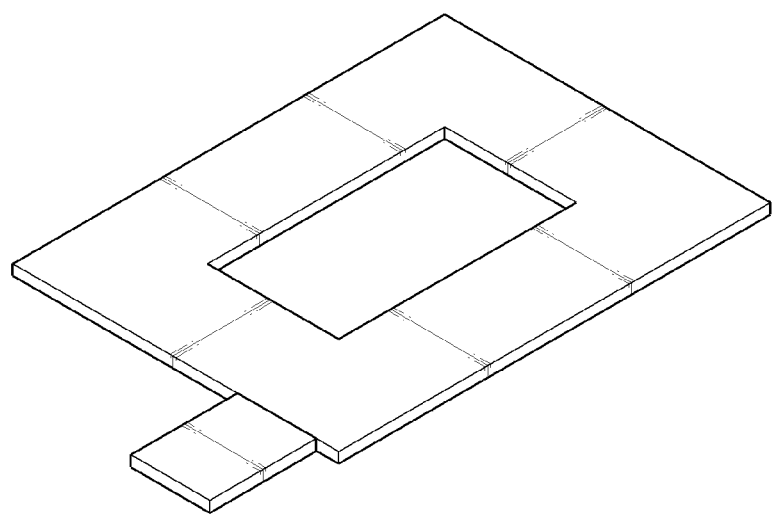
Figure 1C:
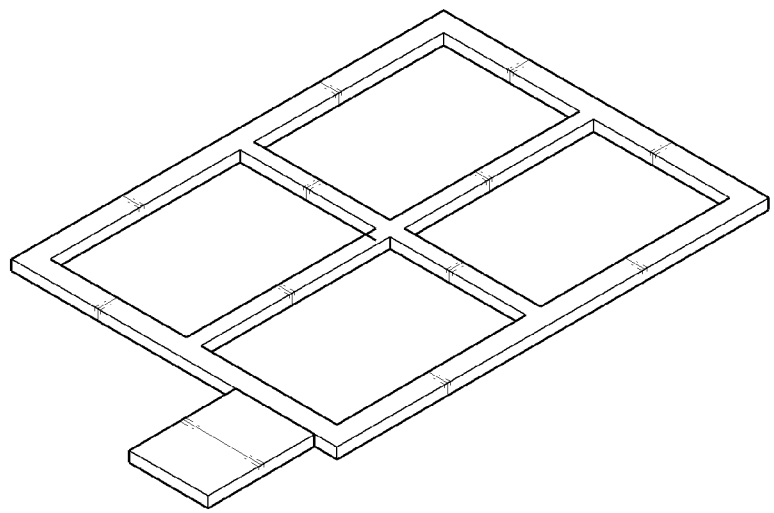
Figure 1D:
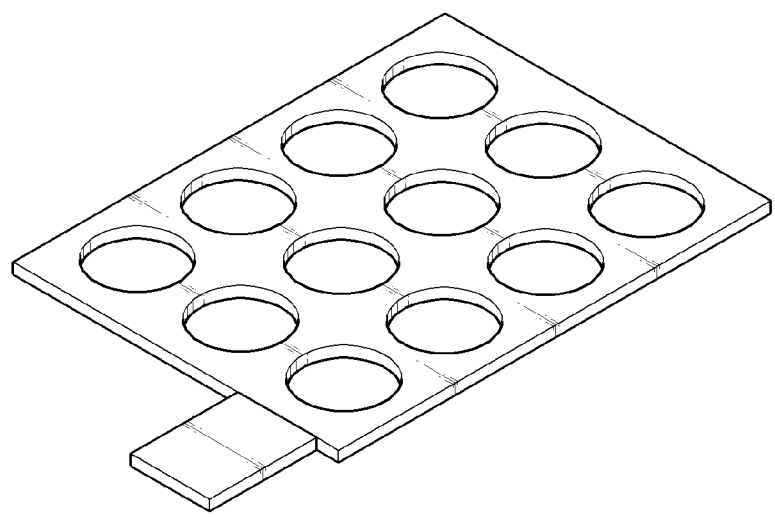
Figure 1E:
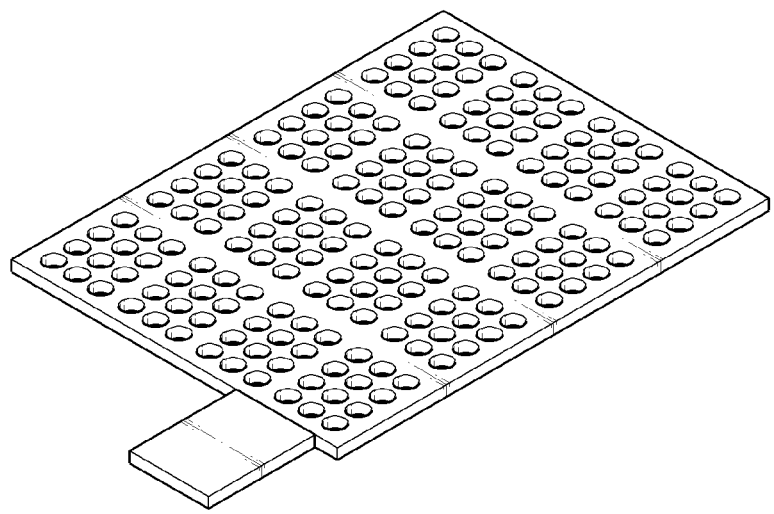

According to an embodiment of the present disclosure, the current collecting portion provided with at least one through-hole may have a ring-, mesh- or grid-like shape. In the case of a grid-like shape, the pattern shape and size are not particularly limited. FIG. 1a to FIG. 1f illustrate typical types of current collectors applicable to the present disclosure. The current collectors illustrated in FIG. 1a and FIG. 1b have a ring-shaped current collecting portion provided with one through-hole and they may take various shapes depending on the area of the current collecting portion except the through-hole. FIG. 1c to FIG. 1e illustrate grid-shaped and mesh-shaped current collectors having two or more through-holes.

The electrode current collector may be made of a material selected from stainless steel, aluminum, nickel, titanium, baked carbon, copper; stainless steel surface-treated with carbon, nickel, titanium or silver; aluminum-cadmium alloy; a non-conductive polymer surface-treated with a conductive material; and a conductive polymer.

In addition, the electrode current collector may have a thickness of 6 µm-1 mm, particularly, 10 µm-100 µm, but is not limited thereto. In addition, the current collector may have a size selected adequately depending on the use of an electrode with no particular limitation.

According to an embodiment of the present disclosure, the tab connecting portion extended from the edge of the current collecting portion and connected to a tab may be provided with at least one through-hole, like the current collecting portion. Herein, in the tab connecting portion, the area of the tab connecting portion except the through-hole may be 50-100% based on the total area of the tab connecting portion. When the area of the tab connecting portion except the through-hole satisfies the above-defined range, it is possible to ensure tab welding strength with ease. Similar to the current collecting portion, the tab connecting portion provided with at least one through-hole may have a ring-, mesh- or grid-like shape.

Figure 1F:
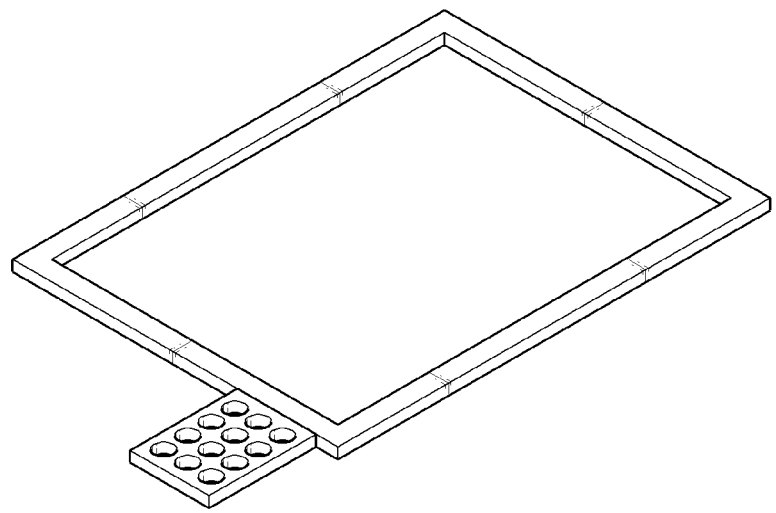

FIG. 1f illustrates an electrode current collector including a ring-shaped current collecting portion and a tab connecting portion having at least one through-hole.

Figure 2B:
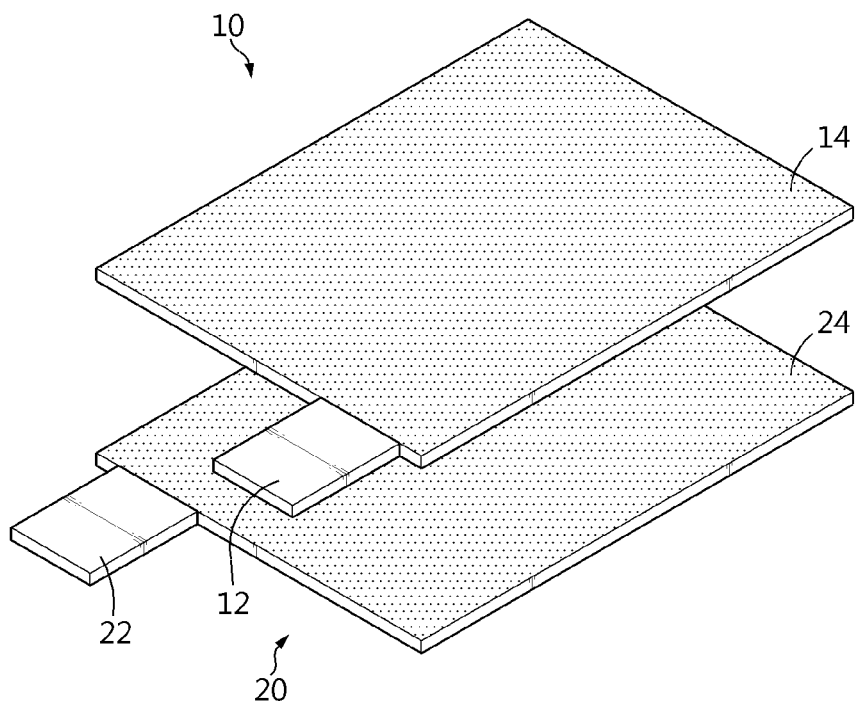

Next, as shown in FIG. 2b, electrode slurry including an electrode active material, a binder, a conductive material and a solvent is applied onto at least one surface of the edge of the current collecting portion and over the through-hole through electrospinning to form a positive electrode active material layer 14 and a negative electrode active material layer 24 on at least one surface of the electrode current collector, thereby providing a positive electrode 10 and a negative electrode 20 (S2).

According to an embodiment of the present disclosure, the electrode active material layer may be formed by coating slurry, obtained by dispersing an active material, a binder and a conductive material into a solvent, onto at least one surface of the electrode current collector through electrospinning, followed by drying. Herein, the electrospinning-based coating is carried out by introducing the slurry as a spinning solution to an electrospinning nozzle controlled to a temperature ranging from room temperature to 80° C., and then performing electrospinning in the presence of electric field formed between the electrospinning nozzle and the electrode current collector. For example, the electric field may be formed by applying a voltage of 1-30 kV. Then, the slurry containing the active material is spun from the electrospinning nozzle to which the high voltage is applied, so that a fibrous active material layer may be formed on the electrode current collector. The fibrous active material layer may be entangled and have a three-dimensional (3D) shape, and the fibers may have a diameter of 500 nm-50 μm and a length of 5 μm or more.

Herein, the electrode current collector as an electrospinning target facing the spinning nozzle may be disposed in parallel with the bottom surface, or in a direction perpendicular to the bottom surface. Since most of the solvent is dried simultaneously with electrospinning, the electrode active material layer structure may be formed sufficiently on the current collector. In addition, after manufacturing an electrode, the electrode strength may be improved through pressing. Thus, even though the electrode is formed by using the current collector having a through-hole, there is no limitation in the formation and handling of the electrode.

According to the present disclosure, since the active material slurry is coated through electrospinning, it is possible to form a uniform coating layer regardless of the pattern shape and size of the electrode current collector. For example, in the case of a die coating process used conventionally for forming an electrode active material layer, the active material slurry may pass downwardly along the through-hole depending on the size of the through-hole of the electrode current collector. Thus, it is difficult to control the loading amount on an electrode. Moreover, the surface opposite to the coating layer may be contaminated. Therefore, a linear (one-dimensional (1D)) process is essentially required to form an electrode active material layer on the current collector of an electrode (positive electrode/negative electrode) including a current collecting portion provided with at least one through-hole, and a tab connecting portion extended from the edge of the current collecting portion according to the present disclosure. As a result, according to the present disclosure, an electrode active material layer is formed by using a coating process based on electrospinning. Thus, even though the diameter of electrode active material particles is smaller than the diameter of the through-hole of the current collector, it is possible to form an active material layer, while preventing the active material particles from passing through the through-hole.

The active material that may be used herein includes any ingredients used conventionally for a positive electrode and negative electrode for a lithium secondary battery. Particularly, examples of the positive electrode active material may include any type of active material particles selected from the group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents an atomic proportion of an element forming the oxides, and $0 \leq x < 0.5$, $0 \leq y < 0.5$, $0 \leq z < 0.5$, $0 < x+y+z \leq 1$), or a mixture of two or more of them. Examples of the negative electrode active material may include lithium metal or lithium alloys, carbon, petroleum coke, activated carbon, graphite or the other lithium intercalation materials, such as the other carbonaceous materials.

Particular examples of the binder include polymers, such as polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, polyethylene, polypropylene, polyacrylate, styrene-butadiene rubber (SBR), or the like.

The conductive material is not particularly limited, as long as it has conductivity while not causing any chemical change in a lithium secondary battery. Particular examples of the conductive material include carbon black, such as carbon black, acetylene black, ketjen black, channel black, furnace black, lamp black or thermal black; conductive fibers, such as carbon fibers or metallic fibers; metal powder, such as aluminum or nickel powder; conductive whisker, such as zinc oxide or potassium titanate; a conductive metal oxide such as titanium dioxide; a conductive polymer such as a polyphenylene derivative; or the like.

Particular examples of the solvent include N-methyl pyrrolidone, acetone, water, or the like.

Figure 2C:
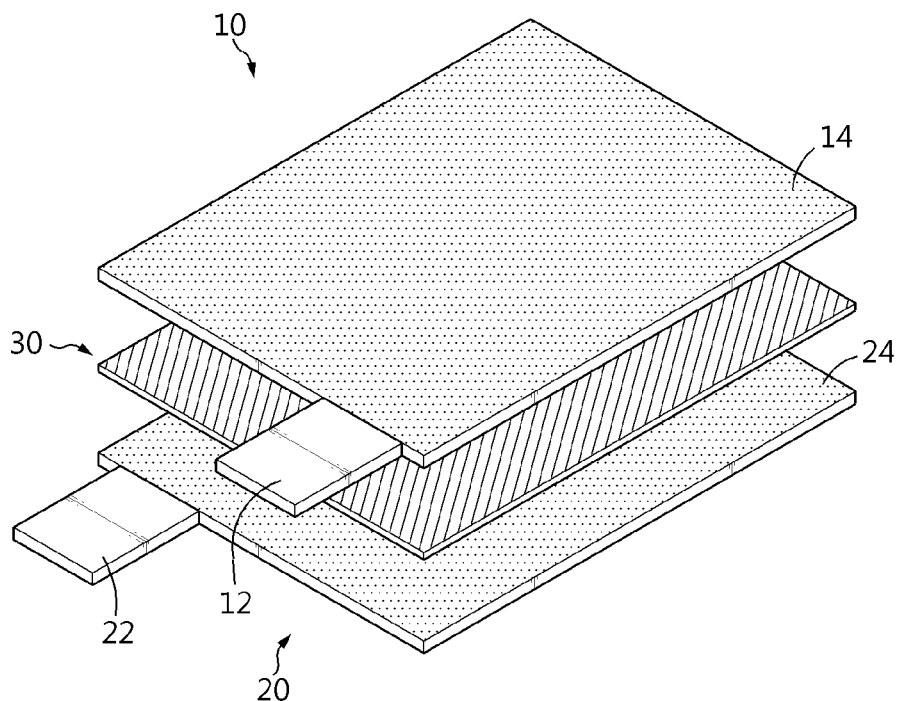

Then, as shown in FIG. 2c, a separator 30 is interposed between the positive electrode 10 and the negative electrode 20 (S4). Herein, it is preferred that the separator 30 is larger than the negative electrode 20 and the negative electrode 20 is larger than the positive electrode 10 with a view to stability.

The separator may be a porous polymer film used conventionally as a separator in a lithium secondary battery. For example, a porous polymer film obtained by using a polyolefin-based polymer, ethylene homopolymer, propylene homopolymer, ethylene/butene copolymer, ethylene/hexene copolymer or ethylene/methacrylate copolymer may be used alone, or a stack of such polymers may be used. In addition, an insulating thin film having high ion permeability and mechanical strength may be used. The separator may include a safety reinforced separator (SRS) provided with an organic/inorganic porous coating layer including inorganic particles interconnected and fixed by means of a binder polymer and coated on the surface of a separator substrate, such as a porous polymer film to a small thickness. In addition to the above examples, the separator may include a conventional porous nonwoven fabric, such as a nonwoven fabric made of glass fibers having a high melting point or polyethylene terephthalate fibers. In addition, such a porous nonwoven fabric may be used after applying the above-mentioned organic/inorganic composite porous coating layer thereto, but is not limited thereto.

Figure 2D:
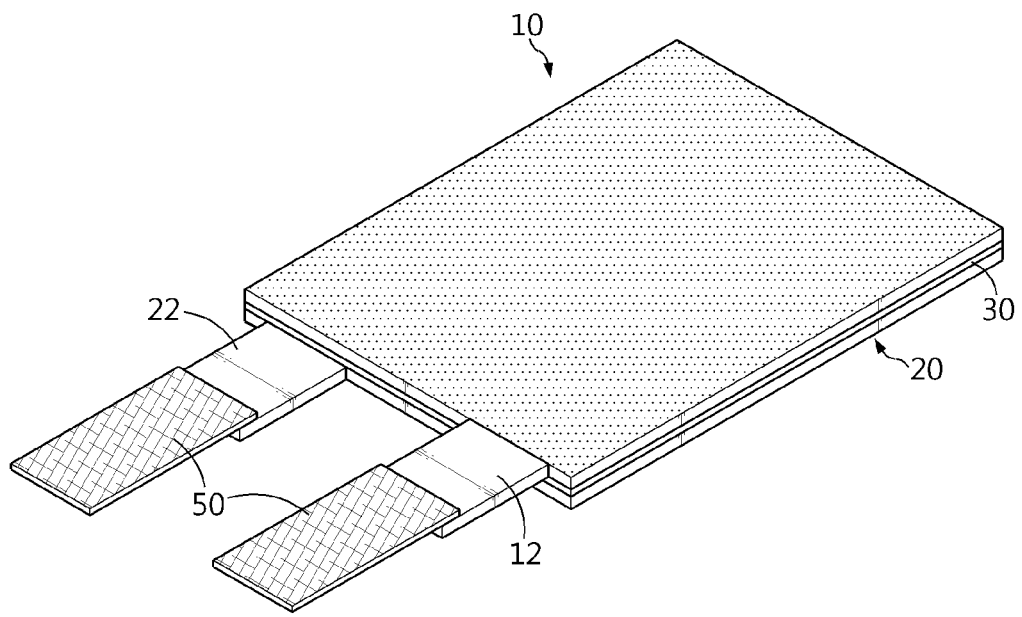
Figure 2E:
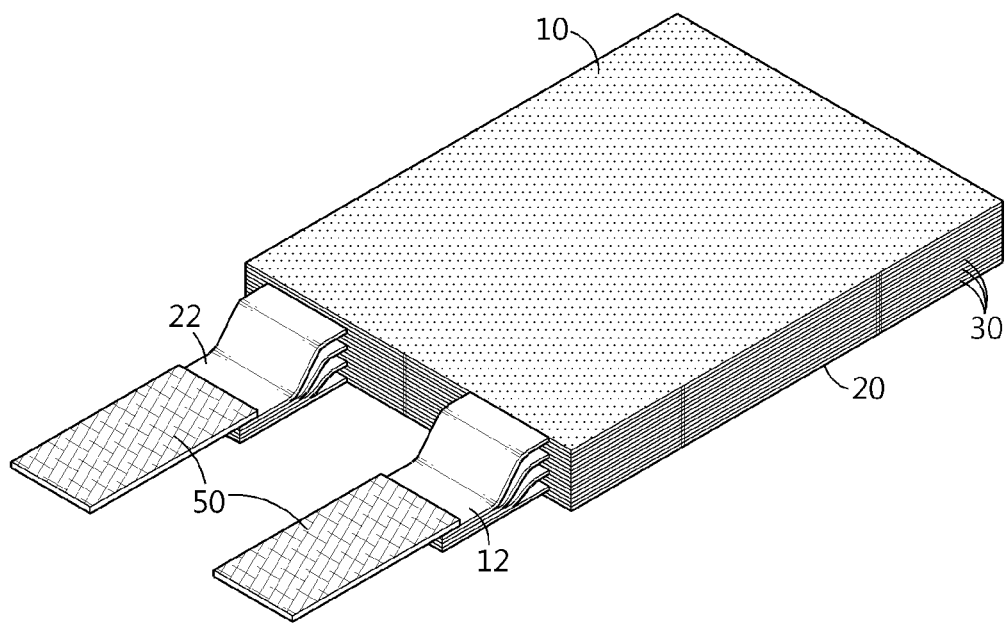

After that, as shown in FIG. 2d, an electrode tab is connected to the tab connecting portion 12, 22 of each current collector, and then an electrode lead 50 is connected to the electrode tab to provide an electrode assembly (S5). In addition, as shown in FIG. 2f, the electrode assembly may include a stack cell in which unit cells are stacked.

Any applicable method may be used to connect the electrode tab to the tab connecting portion. For example, the electrode tab may be connected through welding using heat or ultrasonic waves.

The tab connecting portion 12, 22 is not coated with an active material, and thus generation of resistance is reduced when the tab is connected to the electrode current collector through welding. As a result, it is possible to ensure high binding strength between the current collector and the tab connected thereto. For example, the binding strength between the tab connecting portion extended from the edge of the current collecting portion and the electrode tab connected to the tab connecting portion may satisfy a range of 0.5-1 kgf/6 mm. The binding strength may be determined by the method described in the following Test Example 1. In other words, when a current collector provided with a tab connecting portion is used according to the present disclosure, it is possible to solve the problems according to the related art, including deformation of a current collector during the thermal welding of a tab in the case of the conventional three-dimensional current collector, a difficulty in ensuring sufficient binding strength between the current collector and the tab, generation of resistance and a difficulty in applying ultrasonic welding. In addition, the above-mentioned effects are further increased when the electrode assembly is formed by using stacked cells.

Finally, the electrode assembly is introduced into a battery casing to finish the manufacture of a battery (S6).

According to an embodiment of the present disclosure, in the method for manufacturing a flexible battery, the step of forming an electrode active material layer may include carrying out masking at the tab connecting portion of the electrode current collector by using a mask, before the electrospinning step, forming an electrode active material layer through electrospinning, and then removing the mask from the tab connecting portion of the electrode current collector.

In other words, a step of carrying out masking by using a mask is further introduced to prevent formation of an electrode active material layer at the tab connecting portion of the electrode current collector during the electrospinning step. A particular embodiment of the method will be explained hereinafter.

Figure 3A:
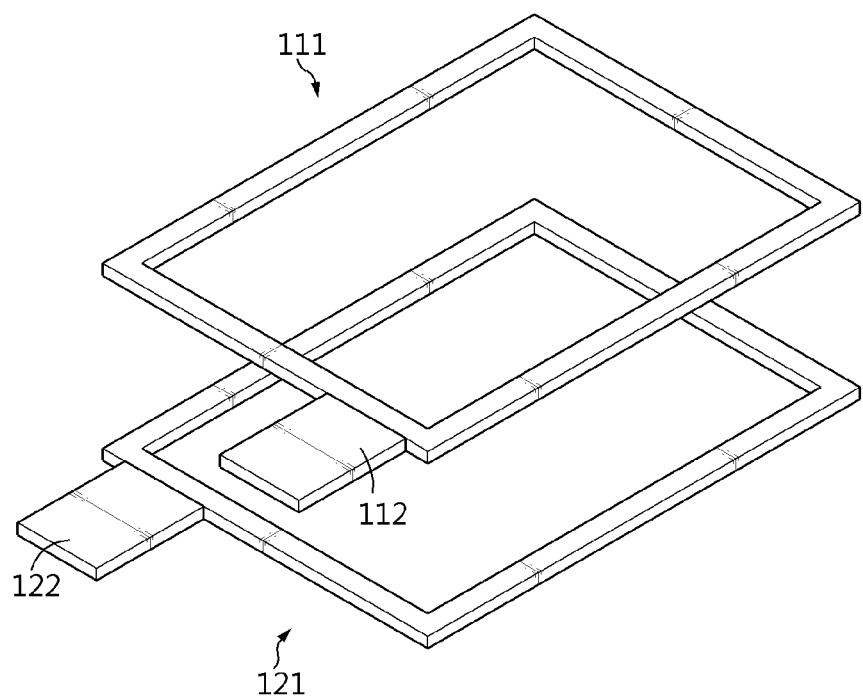
FIG. 3a to FIG. 3f illustrate a series of steps for manufacturing a flexible battery according to an embodiment of the present disclosure.

As shown in FIG. 3a, a positive electrode current collector and a negative electrode current collector each including a current collecting portion 111, 121 provided with at least one through-hole and a tab connecting portion 112, 122 extended from the edge of the current collecting portion are prepared (S1).

Figure 3B:
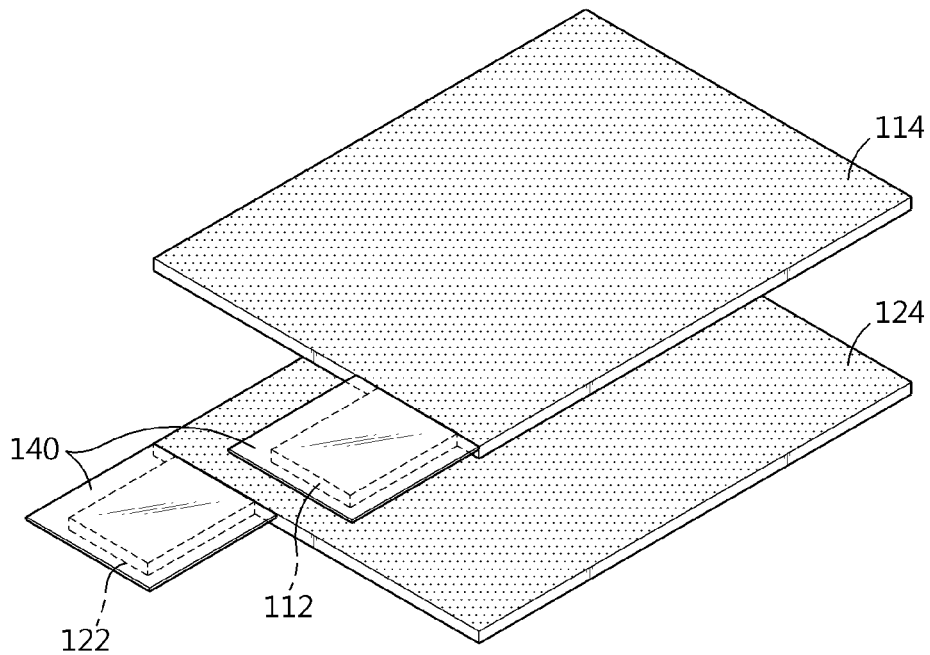

As shown in FIG. 3b, masking is carried out by using a mask 140 in order to prevent formation of an electrode active material layer at the tab connecting portion 112, 122 of each of the current collectors. Then, electrode slurry including an electrode active material, a binder, a conductive material and a solvent is applied onto at least one surface of the edge of the current collecting portion and over the through-hole through electrospinning to form an electrode active material layer 114, 124 on at least one surface of each of the electrode current collectors (S2).

There is no particular limitation in the mask 140, as long as it is used for the conventional masking process. The electrode active material layer may be at least one of a positive electrode active material layer and a negative electrode active material layer.

Figure 3C:
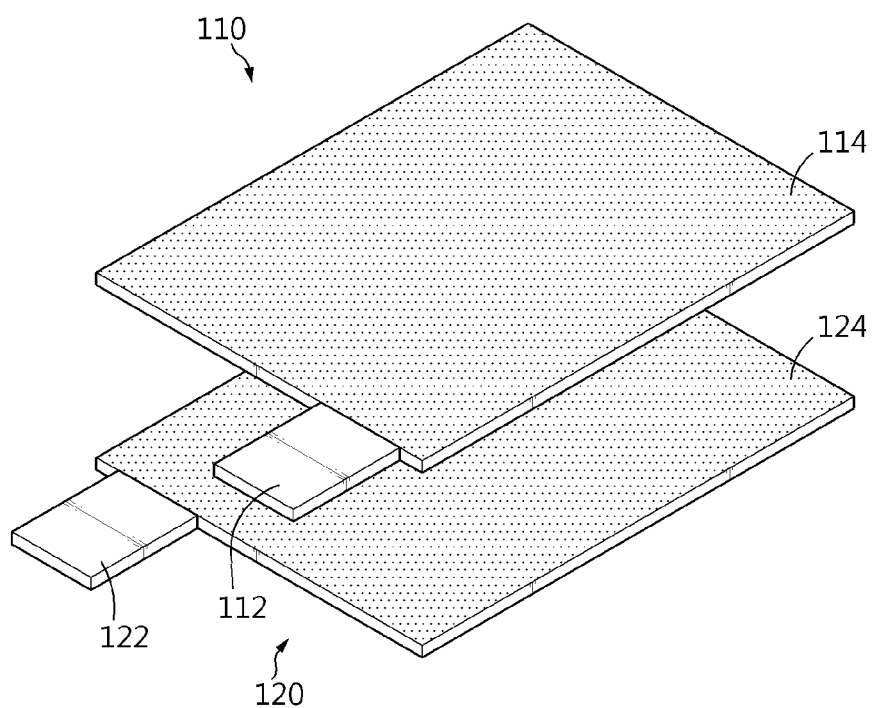

After forming the electrode active material layer for a positive electrode and a negative electrode, the mask 140 is removed from the tab connecting portion 112, 122 of each of the current collectors as shown in FIG. 3c. In this manner, it is possible to obtain a positive electrode 110 including a positive electrode active material layer 114 and a negative electrode 120 including a negative electrode active material layer 124 (S3).

Figure 3D:
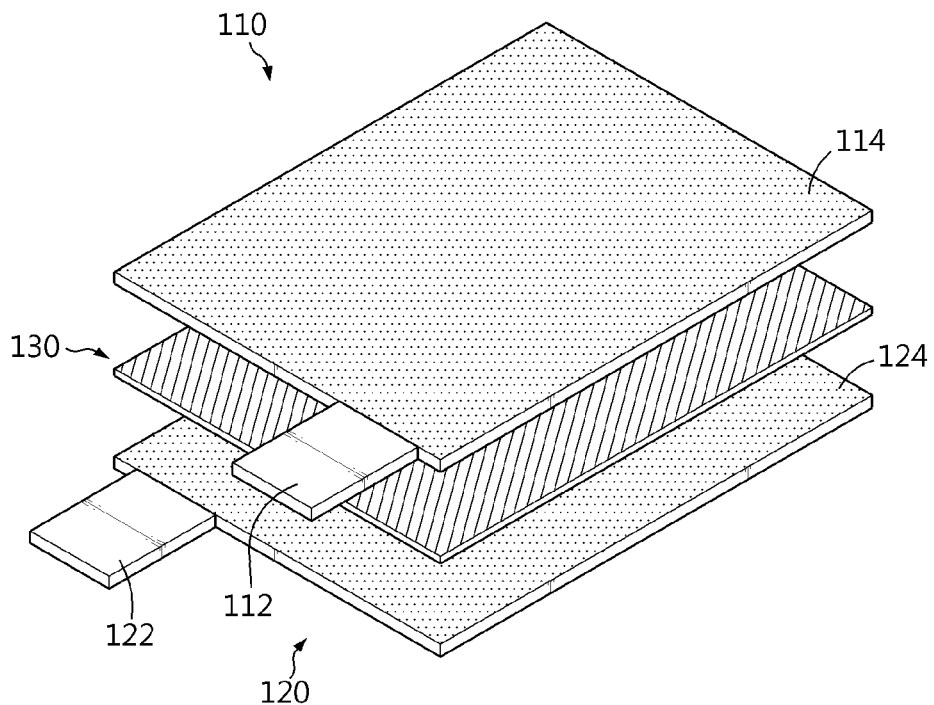

Then, a separator 130 is interposed between the positive electrode 110 and the negative electrode 120 as shown in FIG. 3d (S4). Herein, it is preferred that the separator 130 is larger than the negative electrode 120 and the negative electrode 120 is larger than the positive electrode 110 with a view to stability.

Figure 3E:
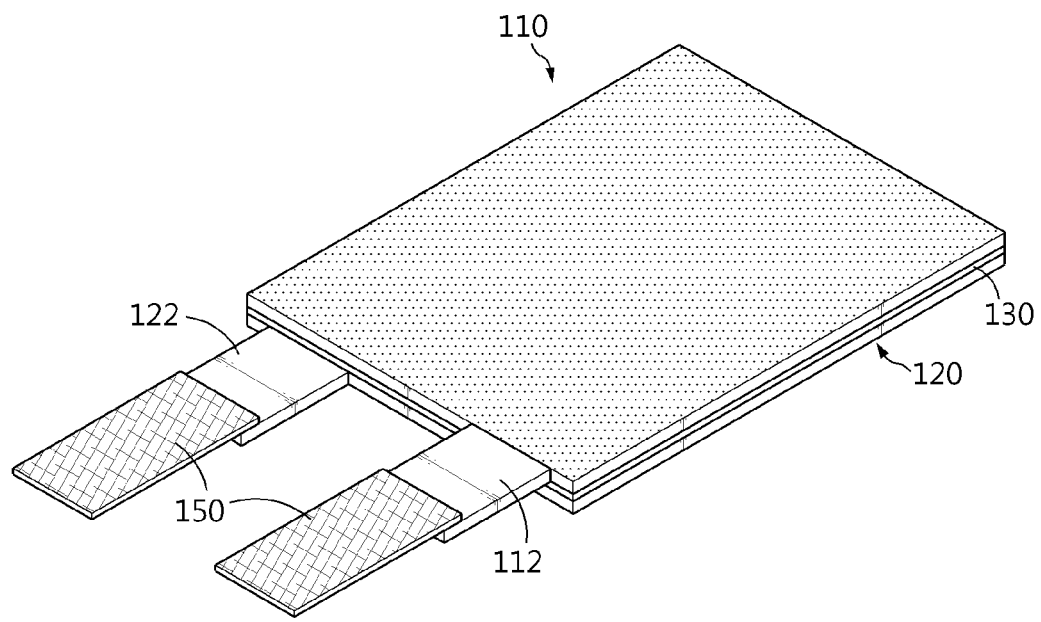
Figure 3F:
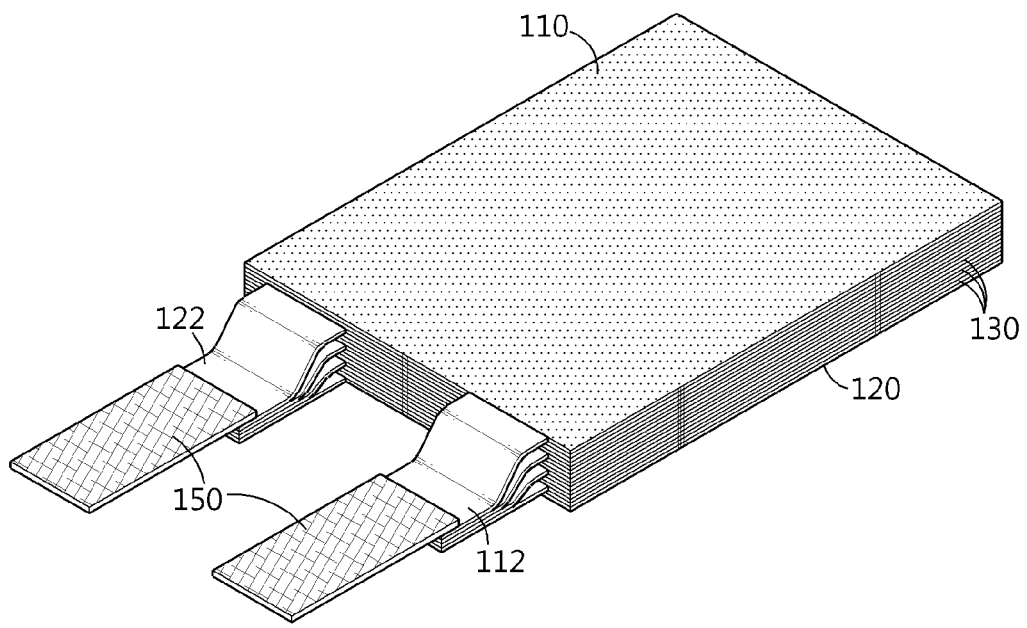

After that, as shown in FIG. 3e, an electrode tab is connected to the tab connecting portion 112, 122 of each of the current collectors, and an electrode lead 150 is connected to the electrode tab to form an electrode assembly (S5). In addition, as shown in FIG. 3f, the electrode assembly may include a stack cell in which unit cells are stacked.

Finally, the electrode assembly is introduced into a battery casing to finish a flexible battery (S6).

An electrolyte including a lithium salt and an organic solvent for dissolving the lithium salt may be used for the flexible battery.

Any lithium salt used conventionally for an electrolyte solution for a secondary battery may be used with no particular limitation. For example, the anion of the lithium salt may be any one selected from the group consisting of $F^-$, $Cl^-$, $Br^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The organic solvent contained in the electrolyte may be a conventional solvent with no particular limitation. Typical examples of the organic solvent may be at least one selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, gamma-butyrolactone, propylene sulfite and tetrahydrofuran.

Particularly, among the carbonate-based organic solvents, ethylene carbonate and propylene carbonate which are cyclic carbonates are preferred, since they are high-viscosity organic solvents and have a high dielectric constant, and thus dissociate the lithium salt in the electrolyte well. When using such cyclic carbonates in combination with low-viscosity low-dielectric constant linear carbonates, such as dimethyl carbonate and diethyl carbonate, at an adequate ratio, it is possible to prepare an electrolyte solution having high electroconductivity, thus such a combined use is more preferable.

The flexible battery obtained as described above ensures flexibility and causes no separation of the active material when it is bent. In the flexible battery, generation of resistance during the welding of the electrode tab is reduced and the binding strength between the electrode current collector and the electrode tab is improved. As a result, it is possible to increase the capacity retention of the flexible battery while repeating cycles.

In another aspect of the present disclosure, there is provided a flexible battery obtained by the above-described method. The flexible battery includes an electrode assembly having a positive electrode, a negative electrode and a separator interposed therebetween, and an electrolyte, wherein at least one of the positive electrode and the negative electrode includes: a current collector having a current collecting portion provided with at least one through-hole; and an electrode active material layer formed on at least one surface of the current collecting portion of the current collector.

The flexible battery according to an embodiment of the present disclosure may be used for various devices requiring flexibility.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

As shown in FIG. 2a, a current collector (thickness: 20 μm) made of Al and having a ring-shaped current collecting portion provided with a single through-hole and a tab connecting portion was prepared. Herein, the area of the current collecting portion except the through-hole was 20% of the total area of the current collecting portion. The tab connecting portion of the current collector was masked with a mask made of a polyimide material.

Meanwhile, 50 parts by weight of $LiCoO_2$ as an active material, 20 parts by weight of carbon black as a conductive material and 30 parts by weight of polyacrylonitrile (PAN) as a binder were added to 150 parts by weight of dimethyl formamide (DMF) as a solvent to obtain positive electrode slurry.

The slurry was introduced to an electrospinning nozzle controlled to a temperature of 25° C. and a voltage of 1.5 kV was applied between the electrospinning nozzle and the masked current collector to carry out electrospinning, thereby forming an active material layer. Herein, fibers having an average sectional diameter of 20 μm were spun randomly onto the current collector having a single through-hole in a linear form across rows or down columns through electrospinning, and then were solidified to form an active material layer. The active material formed on the current collector had a loading amount of 1 mAh/cm$^2$ and a thickness of 40 μm. The mask was removed from the tab connecting portion of the current collector to obtain a positive electrode.

Then, a negative electrode was obtained in the same manner as described above, except that the current collector having an area of the current collecting portion except the through-hole was 20% of the total area of the current collecting portion was used as a current collector (thickness: 20 μm) made of Cu and having a ring-shaped current collecting portion provided with a through-hole and a tab connecting portion; and artificial graphite as an active material, carbon black as a conductive material and polyacrylonitrile (PAN) as a binder were added to dimethyl formamide (DMF) as a solvent at a weight ratio of 50:20:30 to obtain negative electrode slurry.

After a nonwoven fabric made of polyethylene as a separator was stacked between the obtained positive electrode and negative electrode to form an electrode assembly, an electrode tab was thermally welded to the tab connecting portion of the current collector, and an electrode lead was connected thereto. Then, the electrode assembly was introduced to a battery casing, and an electrolyte solution containing a combination of ethylene carbonate (EC) with ethyl methyl carbonate (EMC) (EC:EMC=1:2 (v/v)), 1M $LiPF_6$ and 0.5 wt % of vinylene carbonate (VC) was injected to obtain a lithium secondary battery.

Example 2

A lithium secondary battery was obtained in the same manner as Example 1, except that an Al current collector (thickness: 20 μm), which includes a ring-shaped current collecting portion provided with a single through-hole and a tab connecting portion and has an area of the current collecting portion except the through-hole was 4% of the total area of the current collecting portion, was used as a positive electrode current collector; and a Cu current collector (thickness: 20 μm), which includes a ring-shaped current collecting portion provided with a single through-hole and a tab connecting portion and has an area of the current collecting portion except the through-hole was 4% of the total area of the current collecting portion, was used as a negative electrode current collector.

Example 3

A lithium secondary battery was obtained in the same manner as Example 1, except that an Al current collector (thickness: 20 μm), which includes a ring-shaped current collecting portion provided with a single through-hole and a tab connecting portion and has an area of the current collecting portion except the through-hole was 85% of the total area of the current collecting portion, was used as a positive electrode current collector; and a Cu current collector (thickness: 20 μm), which includes a ring-shaped current collecting portion provided with a single through-hole and a tab connecting portion and has an area of the current collecting portion except the through-hole was 85% of the total area of the current collecting portion, was used as a negative electrode current collector.

Comparative Example 1

A battery was obtained in the same manner as Example 1, except that Al foil having a tab connecting portion was used as a positive electrode current collector and Cu foil having a tab connecting portion was used as a negative electrode current collector.

Comparative Example 2

First, lithium cobalt composite oxide ($LiCoO_2$) as an active material, carbon black as a conductive material and polyvinylidene fluoride (PVdF) were mixed at a weight ratio of 92:4:4 and added to N-methyl-2-pyrrolidone (NMP) as a solvent to obtain positive electrode slurry. Next, the positive electrode slurry was applied onto a felt-shaped Al-plated polyethylene terephthalate (PET) current collector having a porosity of 70%, followed by drying and roll pressing, to obtain a positive electrode.

Meanwhile, artificial graphite as an active material, carbon black as a conductive material and PVdF as a binder were mixed at a weight of ratio of 96:1:3 and added to NMP as a solvent to obtain negative electrode slurry. Then, the negative electrode slurry was applied onto a felt-shaped Cu-plated PET current collector having a porosity of 70%, followed by drying and roll pressing, to obtain a negative electrode.

After a nonwoven fabric made of polyethylene as a separator was stacked between the obtained positive electrode and negative electrode to form an electrode assembly, an electrode tab was thermally welded to the tab connecting portion of the current collector, and an electrode lead was connected thereto. Then, the electrode assembly was introduced to a battery casing, and an electrolyte solution containing a combination of EC with EMC (EC:EMC=1:2 (v/v)), 1M LiPF$_6$ and 0.5 wt % of VC was injected to obtain a lithium secondary battery.

Test Example 1: Evaluation of Binding Strength of Tab

In each of the lithium secondary batteries according to Examples 1-3 and Comparative Examples 1 and 2, tensile strength at the welded tab/lead portion was measured by using a universal testing machine (UTM) to evaluate binding strength. The results are shown in the following Table 1.

Test Example 2: Determination of Electric Resistance at Tab Portion

In each of the lithium secondary batteries according to Examples 1-3 and Comparative Examples 1 and 2, resistance at the welded tab/lead portion was measured by HIOKI 3555 (BATTERY HITESTER). The results are shown in the following Table 1.

Test Example 3: Evaluation of Capacity Retention after Repeating Cycles

Each of the lithium secondary batteries according to Examples 1-3 and Comparative Examples 1 and 2 was subjected to charge/discharge at 0.5C 50 times, while it was bent repeatedly at 25° C., 5R. During the repetition of cycles, the cycle number at which 95% of discharge capacity was retained based on the initial discharge capacity was determined. The results are shown in the following Table 1.

TABLE 1

|  | Example 1 | Example 1 | Example 3 | Comp. Ex. 1 | Comp. Ex. 2 |
| --- | --- | --- | --- | --- | --- |
| Binding strength (Kgf/6 mm) | 0.82 | 0.8 | 0.81 | 0.8 | 0.3 |
| Resistance (mΩ) | 17 | 20 | 15 | 15 | 34 |
| Cycle number (95% of discharge capacity retention) | 45 | 48 | 44 | 30 | 12 |

As can be seen from Table 1, the lithium secondary batteries obtained by using the specific current collectors according to Examples 1-3 show high binding strength at the welded tab portion and maintain a low level of resistance. Particularly, when charge/discharge cycles proceed while the batteries are bent repeatedly, they show high capacity retention. On the contrary, Comparative Example 1 using a conventional foil-type current collector provides good results in terms of tab binding strength and resistance, but shows low capacity retention during charge/discharge cycles under repeated bending due to its poor flexibility.

Meanwhile, Comparative Example 2 using a three-dimensional current collector show low tab binding strength and high resistance (welding of a tab itself is difficult), and the welded tab is separated when bending is repeated, thereby providing significantly low capacity retention and life characteristics.

DESCRIPTION OF DRAWING NUMERALS 10, 100: Positive electrode
20, 120: Negative electrode
30, 130: Separator
11, 21, 111, 121: Current collecting portion
12, 22, 112, 122: Tab connecting portion
14, 24, 114, 124: Active material layer
140: Mask
50, 150: Electrode lead

What is claimed is:

1. A method for manufacturing a flexible battery, comprising the steps of:
   preparing an electrode current collector having a current collecting portion provided with at least one through-hole;
   carrying out electrospinning of electrode slurry comprising an electrode active material, a binder, a conductive material and a solvent on at least one surface of an edge of the current collecting portion and over the through-hole while preventing the electrode slurry from passing through the through-hole to form an electrode active material layer on at least one surface of the electrode current collector; and
   forming a battery provided with the electrode current collector having the electrode active material layer formed thereon as an electrode.

2. The method for manufacturing a flexible battery according to claim 1, wherein the current collecting portion except the through-hole has an area of 4-85% of the total area of the current collecting portion.

3. The method for manufacturing a flexible battery according to claim 1, wherein the current collecting portion has a ring-like, mesh-like or grid-like shape.

4. The method for manufacturing a flexible battery according to claim 1, wherein the electrode current collector is made of any one material selected from stainless steel, aluminum, nickel, titanium, baked carbon, copper; stainless steel surface-treated with carbon, nickel, titanium, silver, gold or platinum; aluminum-cadmium alloys; non-conductive polymers surface-treated with a conductive material; non-conductive polymers surface-treated with a metal; and conductive polymers.

5. The method for manufacturing a flexible battery according to claim 1, wherein the step of forming an electrode active material layer comprises carrying out masking at a tab connecting portion of the electrode current collector by using a mask, before the electrospinning step, forming an electrode active material layer through electrospinning, and then removing the mask from the tab connecting portion of the electrode current collector.

6. The method for manufacturing a flexible battery according to claim 1, wherein the electrode is at least one of a positive electrode and a negative electrode.

7. The method for manufacturing a flexible battery according to claim 1, wherein the step of forming a battery comprises forming an electrode assembly including the electrode and a separator, and introducing the electrode assembly into a battery casing.

8. The method for manufacturing a flexible battery according to claim 1, wherein a tab connecting portion extended from the edge of the current collecting portion and connected to a tab is provided with one or more through-holes.

9. The method for manufacturing a flexible battery according to claim 1, wherein the at least one through-hole is a single through-hole and the current collecting portion has a ring-like shape, and the current collecting portion except the single through-hole has an area of 4-20% of the total area of the current collecting portion.

\* \* \* \* \*